United States Patent
Bi et al.

(10) Patent No.: US 10,945,270 B2
(45) Date of Patent: Mar. 9, 2021

(54) SYSTEM AND METHOD FOR CONFIGURING CHANNEL STATE INFORMATION IN A COMMUNICATIONS SYSTEM

(71) Applicant: FutureWei Technologies, Inc., Plano, TX (US)

(72) Inventors: Hao Bi, Lake Zurich, IL (US); Ke Wang, Shanghai (CN); Zhongfeng Li, Shanghai (CN); Jianmin Lu, San Diego, CA (US); David Jean-Marie Mazzarese, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 264 days.

(21) Appl. No.: 14/040,306

(22) Filed: Sep. 27, 2013

(65) Prior Publication Data

US 2014/0086084 A1    Mar. 27, 2014

Related U.S. Application Data

(60) Provisional application No. 61/706,610, filed on Sep. 27, 2012.

(51) Int. Cl.
*H04W 72/08*    (2009.01)
*H04L 1/00*     (2006.01)
*H04L 25/02*    (2006.01)

(52) U.S. Cl.
CPC ......... *H04W 72/082* (2013.01); *H04L 1/0026* (2013.01); *H04L 1/0027* (2013.01); *H04L 1/0028* (2013.01); *H04L 25/024* (2013.01)

(58) Field of Classification Search
CPC .. H04W 72/082; H04L 1/0026; H04L 1/0027; H04L 1/0028
See application file for complete search history.

(56) References Cited

U.S. PATENT DOCUMENTS

| | | | | |
|---|---|---|---|---|
| 2009/0168718 | A1* | 7/2009 | Wang | H04L 1/0026 370/330 |
| 2010/0135169 | A1* | 6/2010 | Hu | H04L 1/0028 370/252 |

(Continued)

FOREIGN PATENT DOCUMENTS

| | | |
|---|---|---|
| CN | 102368697 A | 3/2012 |
| CN | 102595469 A | 7/2012 |

(Continued)

OTHER PUBLICATIONS

3GPP TSG-RAN WG1 #70, Qingdao, China, Aug. 13-17, 2012 by Erricson.*

(Continued)

*Primary Examiner* — Ajit Patel
*Assistant Examiner* — Pamit Kaur
(74) *Attorney, Agent, or Firm* — Slater Matsil, LLP

(57) ABSTRACT

A method for communicating in a wireless communications system includes generating a channel state information (CSI) process information element (IE) including a CSI process identifier, a non-zero padded CSI-reference signal (CSI-RS) identifier, an interference measurement resource (IMR) identifier, and channel quality indicator (CQI) report configuration information. The method also includes transmitting the CSI process IE.

25 Claims, 8 Drawing Sheets

(56) References Cited

U.S. PATENT DOCUMENTS

| | | |
|---|---|---|
| 2011/0317748 A1 | 12/2011 | Li et al. |
| 2012/0176939 A1 | 7/2012 | Qu et al. |
| 2012/0208547 A1* | 8/2012 | Geirhofer ............ H04B 7/0626 |
| | | 455/452.2 |
| 2013/0035085 A1* | 2/2013 | Axell .................... H04W 24/10 |
| | | 455/419 |
| 2013/0094384 A1 | 4/2013 | Park et al. |
| 2013/0258874 A1* | 10/2013 | Khoshnevis .......... H04L 5/0057 |
| | | 370/252 |
| 2013/0286884 A1 | 10/2013 | Li et al. |
| 2013/0308715 A1* | 11/2013 | Nam .................... H04B 7/0626 |
| | | 375/267 |
| 2014/0355468 A1 | 12/2014 | Li et al. |

FOREIGN PATENT DOCUMENTS

| | | |
|---|---|---|
| CN | 102638432 A | 8/2012 |
| CN | 102640527 A | 8/2012 |
| WO | 2009088739 A1 | 7/2009 |
| WO | 2011145886 A2 | 11/2011 |
| WO | 2012006005 A2 | 1/2012 |

OTHER PUBLICATIONS

3GPP TSG-RAN WG1 #7, Oct. 2012.*
International Search Report and Written Opinion of the Patent Cooperation Treaty (PCT), dated Feb. 28, 2014, 9 pages.
3GPP TSG RAN WG1, Meeting #69, "Final Report of 3GPP TSG RAN WGI #68bis y1.0.0 (Jeju, South Korea, Mar. 26-30, 2012)," Prague, Czech Republic, R1-121926, May 21-25, 2012, 105 pages.
3GPP TSG RAN WG1 #70, "RRC Parameters for Downlink CoMP," Qingdao, China, R1-124032, Aug. 13-17, 2012, 4 pages.
"3rd Generation Partnership Project; Technical Specification Group Radio Access Network; Evolved Universal Terrestrial Radio Access (E-UTRA); Radio Resource Control (RRC); Protocol specification (Release 10)," 3GPP TS 36.331 V10.4.0, Technical Specification, Dec. 2011, 74 pages.
"The Configuration of CSI process," 3GPP TSG-RAN WG2 Meeting #79, R2-12xxxx, Source: Huawei, HiSilicon, Discussion and decision, Bratislava, Slovakia, Oct. 8-12, 2012, 11 pages.
Extended European Search Report received in Application No. 13842816.4-1860 dated May 29, 2015, 8 pages.
Ericsson, et al., "Configuration of CSI Processes for Periodic and Aperiodic Reporting," 3GPP TSG-RAN WG1 #70, R1-123830, Qingdao, China, Aug. 13-17, 2012, 3 pages.
Ericsson, et al., "Measurement framework based on CSI-RS," 3GPP TSG-RAN WG2 #78, Tdoc R2-122529, Prague, Czech Republic, May 21-25, 2012, 4 pages.
Intel Corporation, "CSI Process and Feedback Configuration for DL CoMP" 3GPP TSG-RAN WG2 #79bis R2-124988, Bratislava, Slovakia, Sep. 8-12, 2012, 5 pages.
Ericsson et al., "Configuration of CSI Processes for Periodic and Aperiodic Reporting", 3GPP TSG-RAN WG1 #70, R1-123830, Aug. 13-17, 2012, 3 pages, Qingdao, China.

* cited by examiner

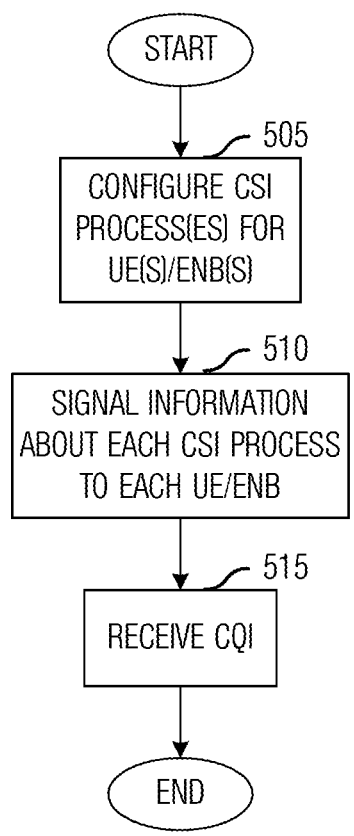
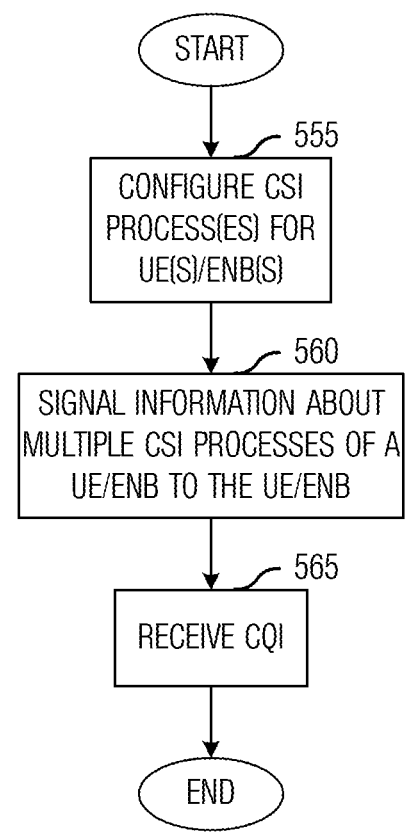
Fig. 5a
Fig. 5b

SYSTEM AND METHOD FOR CONFIGURING CHANNEL STATE INFORMATION IN A COMMUNICATIONS SYSTEM

This application claims the benefit of U.S. Provisional Application No. 61/706,610, filed on Sep. 27, 2012, entitled "System and Method for Channel State Information Configuration," which application is hereby incorporated herein by reference.

TECHNICAL FIELD

The present disclosure relates generally to digital communications, and more particularly to a system and method for configuring channel state information in a communications system.

BACKGROUND

In general, a Third Generation Partnership Project (3GPP) Long Term Evolution (LTE) Release 11 (Rel-11) compliant channel state information (CSI) process provides a CSI feedback mechanism to cope with a new transmission mode, TM10. Compared with CSI processes in earlier releases of 3GPP LTE, multiple CSI processes in Rel-11 can be simultaneously configured in a single carrier. The Rel-11 CSI process has been described as "a combination of a non-zero power (NZP) CSI reference symbol (CSI-RS) resource and an interference measurement resource (IMR). A given CSI process can be used by periodic and/or aperiodic reporting." Hence, the CSI process configuration itself contains most of the radio resource control (RRC) parameters for downlink coordinated multiple point (CoMP) operation.

SUMMARY OF THE DISCLOSURE

Example embodiments of the present disclosure which provide a system and method for configuring channel state information in a communications system.

In accordance with an example embodiment of the present disclosure, a method for communicating in a wireless communications system is provided. The method includes generating, by a device, a channel state information (CSI) process information element (IE) including a CSI process identifier, a non-zero power CSI-reference signal (CSI-RS) identifier, an interference measurement resource (IMR) identifier, and channel quality indicator (CQI) report configuration information. The method also includes transmitting, by the device, the CSI process IE.

In accordance with another example embodiment of the present disclosure, a method for communicating in a wireless communications system is provided. The method includes receiving, by a receiving device, a channel state information (CSI) process information element (IE) including a CSI process identifier, a non-zero power CSI-reference signal (CSI-RS) identifier, an interference measurement resource (IMR) identifier, and channel quality indicator (CQI) report configuration information. The method also includes processing, by the device, the CSI process IE.

In accordance with another example embodiment of the present disclosure, a device is provided. The device includes a processor, and a transmitter operatively coupled to the processor. The processor generates a channel state information (CSI) process information element (IE) including a CSI process identifier, a non-zero power CSI-reference signal (CSI-RS) identifier, an interference measurement resource (IMR) identifier, and channel quality indicator (CQI) report configuration information. The transmitter transmits the CSI process IE.

In accordance with another example embodiment of the present disclosure, a receiving device is provided. The receiving device includes a receiver, and a processor operatively coupled to the receiver. The receiver receives a channel state information (CSI) process information element (IE) including a CSI process identifier, a non-zero power CSI-reference signal (CSI-RS) identifier, an interference measurement resource (IMR) identifier, and channel quality indicator (CQI) report configuration information. The processor operates on the CSI process IE.

One advantage of an embodiment is that multiple CSI processes may be configured for a single carrier, permitting a receiving device to measure channel quality for channels from multiple transmission points.

A further advantage of an embodiment is that the multiple CSI processes are referenced according to their respective identifiers, which helps to reduce signaling overhead.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 5a illustrates an example flow diagram of operations occurring in a device as the device configures CSI processes for a receiving device with information for each CSI process being individually signaled according to example embodiments described herein;

FIG. 5b illustrates an example flow diagram of operations occurring in a device as the device configures CSI processes for a receiving device with information for CSI processes of a single receiving device being signaled together according to example embodiments described herein;

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to configuring channel state information in a communications system. For example, a device transmits a CSI process IE including a CSI process identifier, a non-zero power CSI-reference signal (CSI-RS) identifier, an interference measurement resource (IMR) identifier, and channel quality indicator (CQI) report configuration information. As another example, a receiving device receives a CSI process IE including a CSI process identifier, a non-zero power CSI-reference signal (CSI-RS) identifier, an interference measurement resource (IMR) identifier, and channel quality indicator (CQI) report configuration information.

The present disclosure will be described with respect to example embodiments in a specific context, namely a Third Generation Partnership Project (3GPP) Long Term Evolution (LTE) compliant communications system that supports multiple CSI processes for a single carrier. The disclosure may also be applied, however, to other standards compliant and non-standards communications systems that support multiple CSI processes per single carrier.

Figure 1:
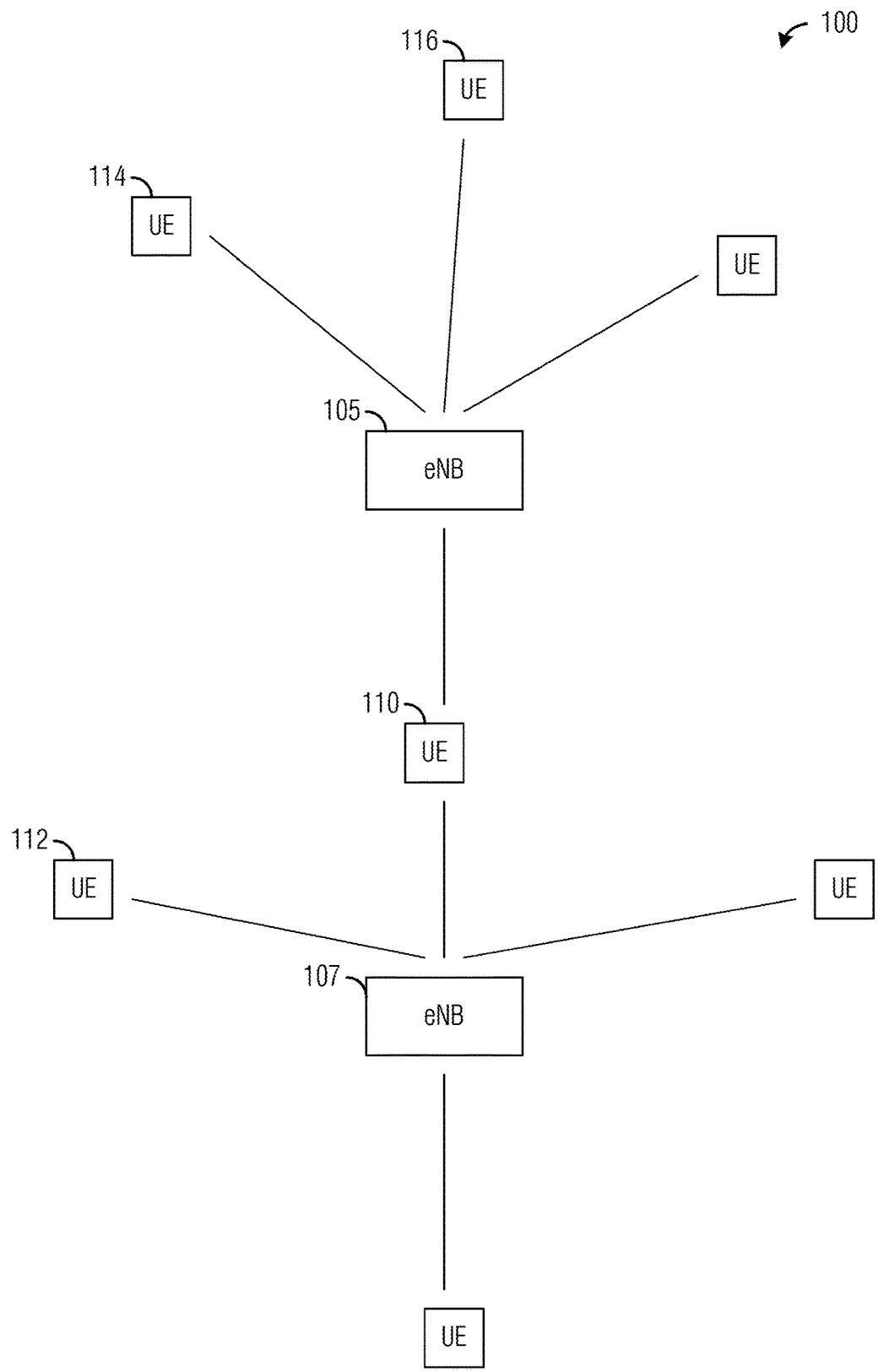
FIG. 1 illustrates an example communications system according to example embodiments described herein.

FIG. 1 illustrates a communications system 100. Communications system 100 includes a plurality of evolved NodeBs (eNBs), including eNB 105 and eNB 107, serving a plurality of user equipments (UEs), such as UE 110-116. eNBs may also be referred to as NodeBs, base stations, communications controllers, and the like, while UEs may also be referred to as mobile stations, mobiles, terminals, users, subscribers, and the like. Generally, transmission to or from a UE occur on network resources allocated to the UE by its serving eNB. While it is understood that communications systems may employ multiple eNBs capable of communicating with a number of UEs, only two eNBs, and a number of UEs are illustrated for simplicity.

In order to achieve good performance and to increase communications efficiency, devices that transmit and/or receive (such as eNBs and UEs, as well as those that are involved in supporting communications) may need to have an idea of the quality or the state of communications channels used to transmit and/or receive. Typically, a first device may be able to measure the quality of a communications channel between itself and a second device in an incoming direction based on transmissions received from the second device. In other words, the first device may be able to perform a measurement of the quality or the state of a first one-way communications channel starting at the second device and ending at the first device. However, it may not so easy to measure the quality or the state of a second one-way communications channel starting at the first device and ending at the second device. In time division duplex communications channels, channel reciprocity may be used to derive the quality or the state of the second one-way communications channel from the quality or the state of the first one-way communications channel. However, channel reciprocity usually does not provide good results when used with frequency division duplexed communications channels or when there is not a corresponding one-way communications channel going in the opposite direction.

In frequency division duplex communications channels, a technique that is commonly used is to have the second device measure the quality or the state of the second one-way communications channel based on transmissions made by the first device and then reporting the measured quality or the measured state of the second one-way communications channel to the first device. The quality or the state of the communications channel is referred to as CSI, and this technique is commonly referred to as CSI reporting.

Figure 2:
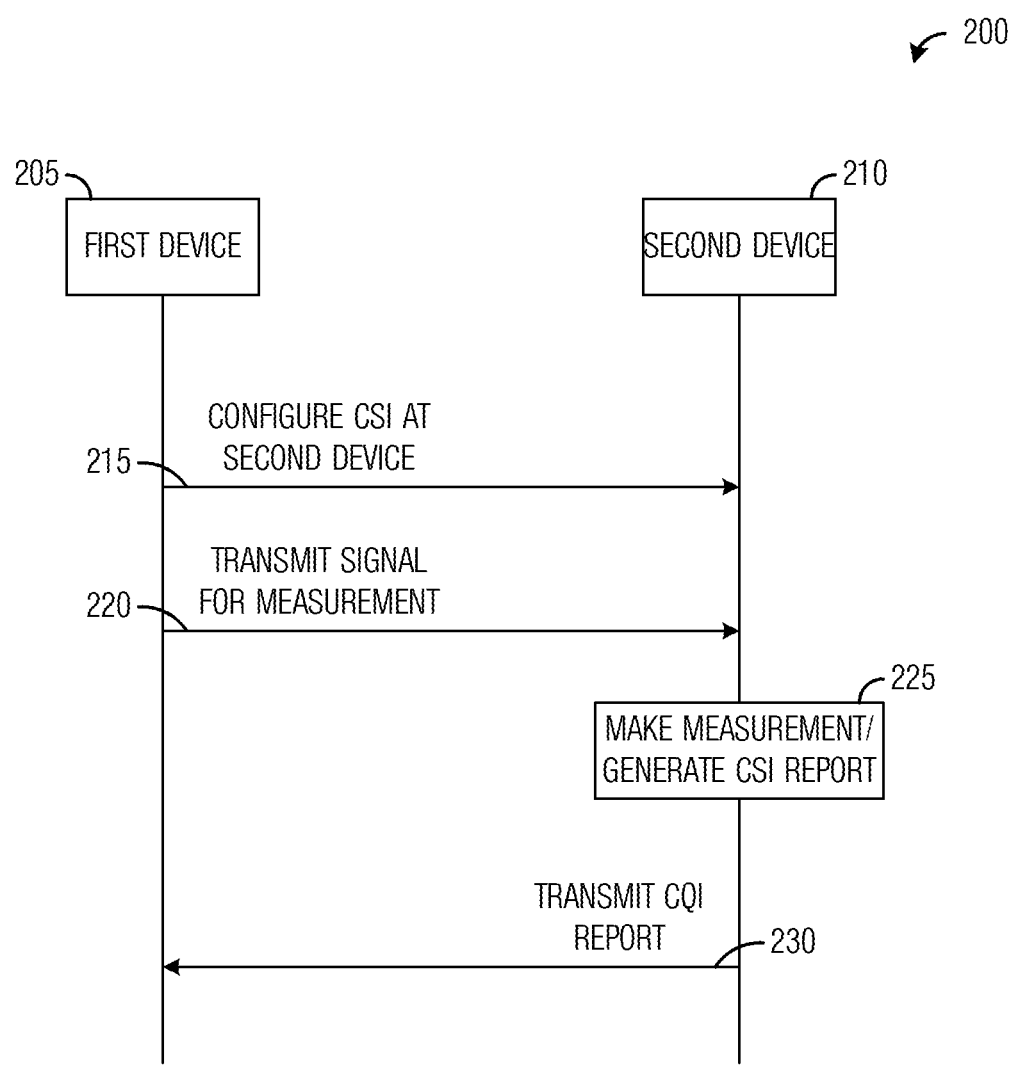
FIG. 2 illustrates an example message exchange diagram highlighting messages exchanged between a first device and a second device according to example embodiments described herein.

FIG. 2 illustrates a message exchange diagram 200 highlighting messages exchanged between a first device 205 and a second device 210. Message exchange diagram 200 highlights messages exchanged between first device 205 and second device 210 as second device 210 measures and reports CSI for a one-way communications channel between first device 205 and second device 210.

First device 205 may configure CSI operations at second device 210 by transmitting configuration information (or an indication thereof) to second device 210 (shown as event 215). As an illustrative example, the configuration information may include a specified time-frequency resource(s) that second device 210 is to measure to determine the CSI of the one-way channel, what signal first device 205 is transmitting in the specified time-frequency resource(s), when second device 210 is report the CSI, how long second device 210 is to continue with the CSI operations, and the like. First device 205 may transmit the signal in the specified time-frequency resource(s) for measurement purposes (shown as event 220).

Second device 210 may measure the signal in the specified time-frequency resource(s) and generate a channel quality indicator (CQI) in accordance with the measurement (shown as event 225). CQI may be considered to be a quantized representation of the CSI. Second device 210 may report the CQI to first device 205 in accordance with the configuration information (shown as event 230). Although the discussion of FIG. 2 focuses on the reporting of CQI by second device 210, second device 210 may report the CSI in a variety of forms, including: raw measurement, unquantized CSI, a transformation of the CSI, a mathematical function of the CSI, and the like.

Coordinated multiple point (CoMP) operation is a relatively new addition to the 3GPP LTE technical standards that allows multiple transmission points (e.g., eNBs, macro cells, pico cells, remote antennas, remote radio heads (RRHs), and the like) to transmit to a single receiving point (e.g., UE, eNB, and the like) to improve resource utilization, diversity gain, communications system performance, and the like. For discussion purposes, CoMP transmission is discussed in detail. However, the example embodiments are also operable with CoMP reception. Therefore, the focus on CoMP transmission should not be construed as being limiting to either the scope or the spirit of the example embodiments.

Figure 3:
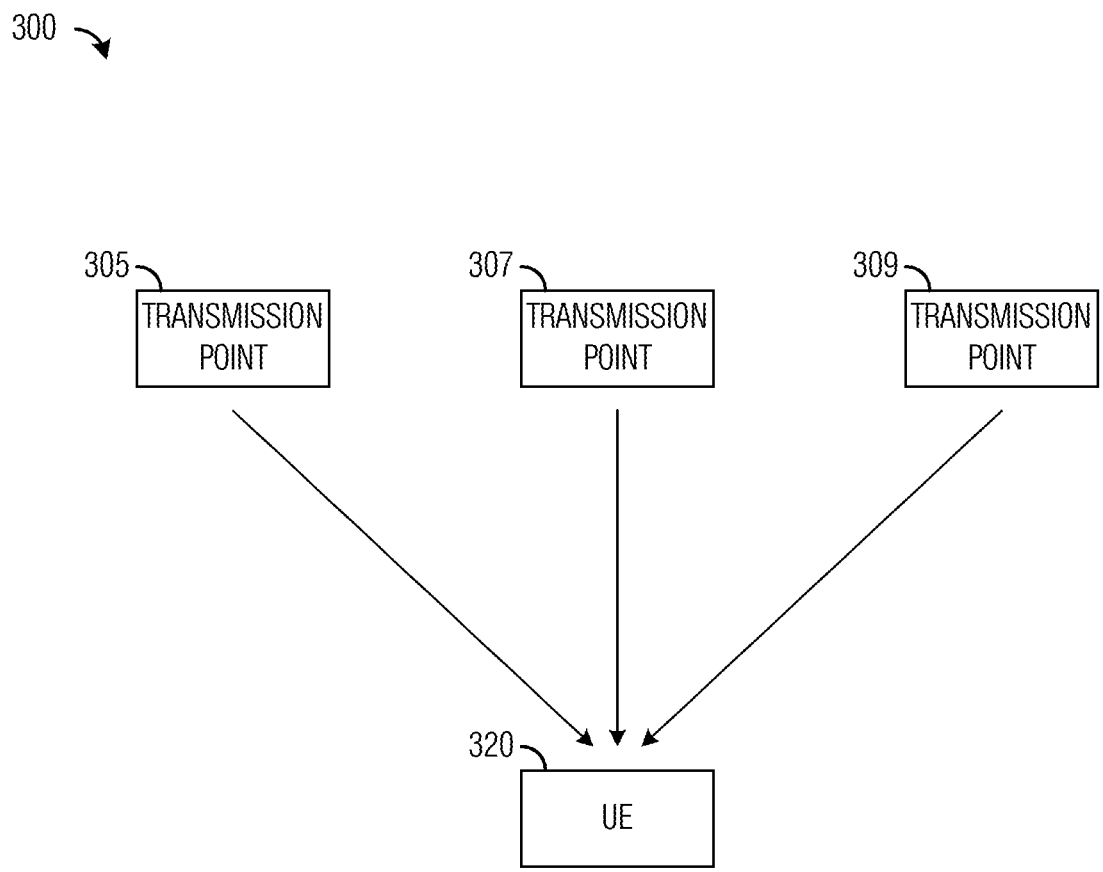
FIG. 3 illustrates an example CoMP transmission in a communications system according to example embodiments described herein.

FIG. 3 illustrates CoMP transmission in a communications system 300. As shown in FIG. 3, communications system 300 includes three transmission points (transmission point 305, transmission point 307, and transmission point 309) and a UE 320. The three transmission points transmit to UE 320 and UE 320 combines the transmissions from the three transmission points to potentially achieve greater communications efficiency than if it only received transmissions from a single transmission point.

As discussed previously, in order to obtain good communications performance, the three transmission points may need to know the quality or the state of communications channels between themselves and UE 320. UE 320 may make separate measurements of transmissions made by each of the three transmission points and report the CSI to the three transmission points.

According to an example embodiment, the support for the simultaneous configuration of multiple CSI processes in a single carrier in 3GPP LTE Release 11 may allow for efficient implementation of CoMP transmission in a communications system. A device (i.e., one of the three transmission points, a controller of one of the three transmission points, an entity in the communications system tasked to configure CSI, and the like) may configure a receiving point (e.g., UE 320) to initialize an appropriate number of CSI processes (3 in this example) to measure the communications channels from a plurality of transmission points (e.g., the three transmission points) to the receiving point (e.g., UE 320).

It is noted that in a CoMP reception scenario where a transmission point transmits to multiple receiving points, a device (i.e., the transmission point, a controller of the transmission point, an entity in the communications system tasked to configure CSI, and the like) may configure each of the receiving points to initialize an appropriate number of CSI processes to measure the communications channel from the transmission point to each of the receiving points. Since multiple receiving points are involved, the device may separately configure each receiving point. However, it may be possible to broadcast CSI configuration information to all of the receiving points.

According to an example embodiment, utilizing the features of 3GPP LTE Release 11 CSI processes (including: multiple CSI process may be simultaneously configured for a carrier, and a combination of NZP resources and an IMR), a CSI configuration is presented. A first part of the CSI configuration includes a CSI process identifier (CSI ID) that may be used to identify corresponding CSI processing in a given evolved Universal Mobile Telecommunications System (UMTS) Terrestrial Radio Access Network (E-UTRAN) carrier. A second part of the CSI configuration includes a CSI measurement part (i.e., resources to be used for the CSI measurement), including a NZP CSI-RS and an IMR. A third part of the CSI configuration includes a report (reporting) configuration for periodic and/or aperiodic reporting, for example. It is noted that since CSI processes are configured on a per carrier basis, it is reasonable that the elements (parts) of the CSI processes are also configured on a per carrier basis. The CSI processes may implemented in 3GPP LTE compliant communications systems and devices, such as eNBs, UEs, and the like.

Figure 4:
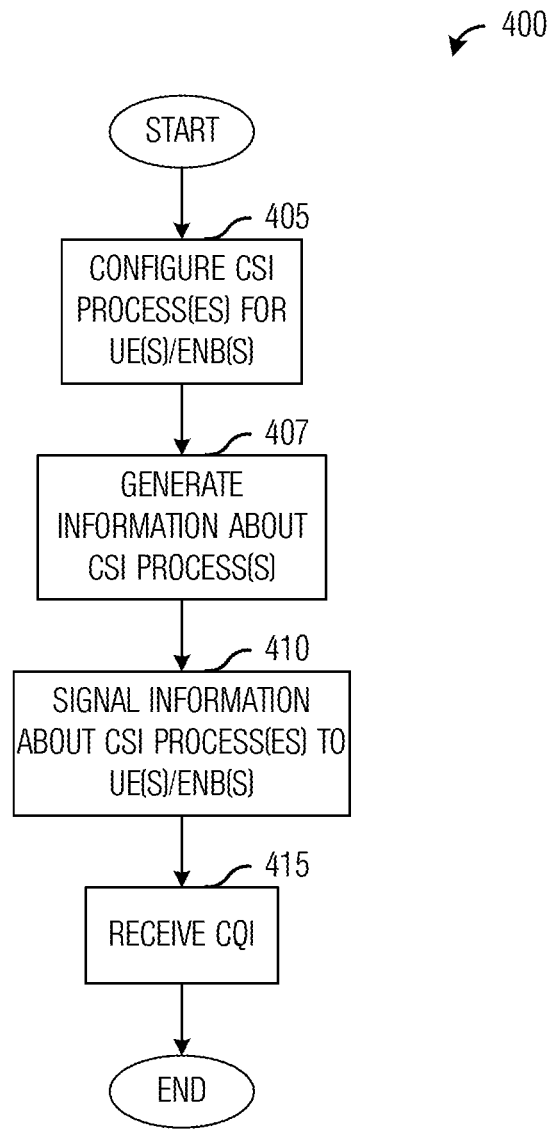
FIG. 4 illustrates an example flow diagram of operations occurring in a device as the device configures CSI processes for a receiving device according to example embodiments described herein.

FIG. 4 illustrates a flow diagram of operations 400 occurring in a device as the device configures CSI processes for a receiving device. Operations 400 may be indicative of operations occurring in a device, such as an eNB, a controller of an eNB, a UE, and the like, as the device configures CSI processes of a receiving device, such as a UE or an eNB.

Operations 400 may begin with the device configuring CSI processes for a receiving device(s) (such as UEs, eNBs, or a combination of UEs and eNBs) (block 405). According to an example embodiment, the device may separately configure CSI processes for each receiving device. In other words, the device may configure the CSI processes for a first receiving device, configure the CSI processes for a second receiving device, and the like. The device may generate information about the configured CSI processes (block 407). As an example, the device may generate a CSI process information element (IE). The device may transmit information about the configured CSI processes (e.g., the CSI process IEs) to the receiving devices (block 410). According to an example embodiment, the device may transmit the information about the configured CSI processes to each individual receiving device using a radio resource control (RRC) message, the RRC message may contain all of information about the configured CSI processes for the individual receiving device. Alternatively, multiple RRC messages may be transmitted by the device to each individual receiving device, with each RRC message containing information about a single configured CSI process. The device may receive a CQI (or some other form of information about the channel quality or channel state) from a receiving device in accordance with the information about the configured CSI process(es) (block 415).

FIG. 5a illustrates a flow diagram of operations 500 occurring in a device as the device configures CSI processes for a receiving device with information for each CSI process being individually signaled. The device may configure the CSI processes for the receiving devices (block 505) and generate a CSI process IE for the CSI processes. The device may transmit information for each individual CSI process (i.e., the CSI process IEs) to a receiving device (block 510). The device may receive a CQI (or some other form of information about the channel quality or channel state) from a receiving device in accordance with the information for the CSI process(s) (block 515).

FIG. 5b illustrates a flow diagram of operations 550 occurring in a device as the device configures CSI processes for a receiving device with information for CSI processes of a single receiving device being signaled together. The device may configure the CSI processes for the receiving devices (block 555) and generate a CSI process IE for the CSI processes. The device may transmit information for CSI processes of a single receiving device (i.e., the CSI process IEs) to the receiving device in single message (block 560). The device may receive a CQI (or some other form of information about the channel quality or channel state) from a receiving device in accordance with the information for the CSI process(s) (block 565).

Figure 6:
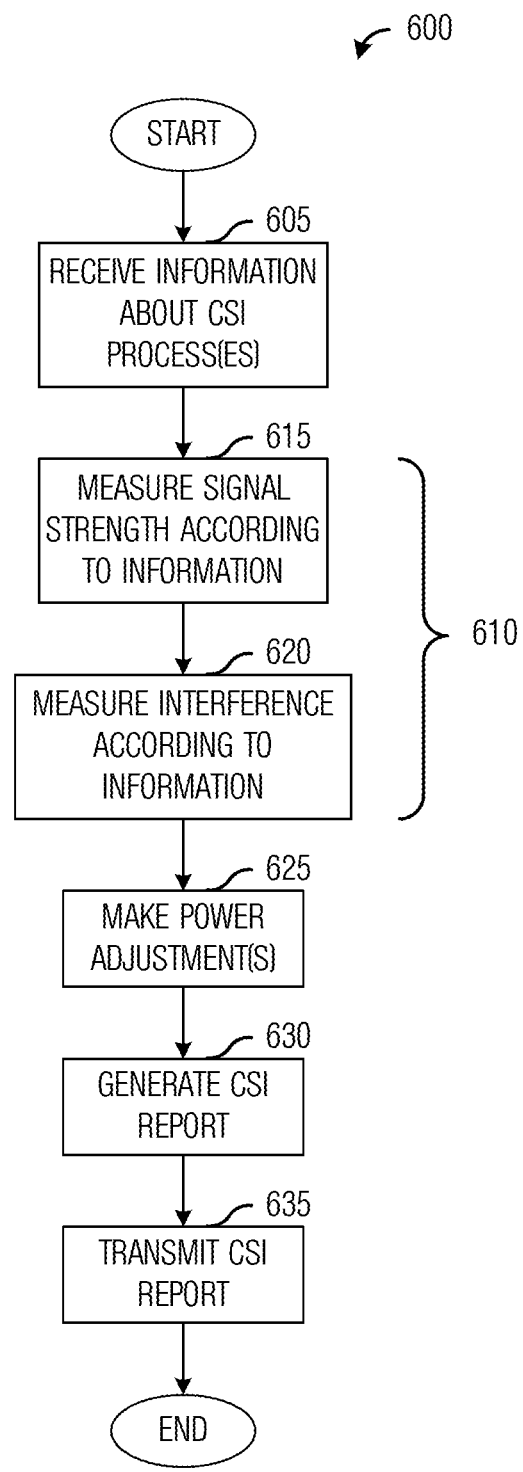
FIG. 6 illustrates an example flow diagram of operations occurring in a receiving device as the receiving device performs CSI reporting according to example embodiments described herein.

FIG. 6 illustrates a flow diagram of operations 600 occurring in a receiving device as the receiving device performs CSI reporting. Operations 600 may be indicative of operations occurring in a receiving device, such as a UE or an eNB, as the receiving device performs CSI reporting.

Operations 600 may begin with the receiving device receiving information about a CSI process(es) configured for the receiving device, i.e., the CSI process IEs (block 605). If multiple CSI processes are configured for the receiving device, the receiving device may receive a single message containing information about the CSI processes or multiple messages containing information about an individual CSI process. The receiving device may measure the communications channel in accordance with the information about the CSI processes (blocks 610). According to an example embodiment, measuring the communications channel may include the receiving device measuring a signal strength using NZP CSI-RS resources for each CSI process (block 615) and an interference using the IMR for each CSI process (block 620).

The receiving device may make power adjustments to the measurements (block 625). A detailed discussion of the power adjustments is presented below. The receiving device may generate a CQI report (block 630) and transmit the CQI report in accordance with the information about the CSI process, in the form of a CQI (or some other form of information about the channel quality or channel state), for example (block 635). As an illustrative example, the information about the CSI report may specify when the receiving device is to transmit the CSI report, such as time, periodicity, frequency, receipt of an event (such as a transmit trigger, for example), and the like. Blocks 615-630 may be considered to be processing of the CSI process IEs by the receiving device.

As discussed previously, the information about the CSI process(es) may be transmitted by a device to a receiving device. Generally, the information about the CSI process(es) may be transmitted in a higher layer message, such as a RRC message. However, it may be possible to broadcast the information about the CSI process(es).

Figure 7A:
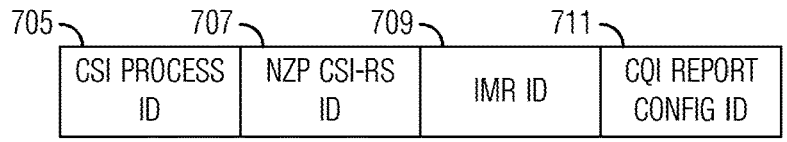
FIG. 7a illustrates a first example IE used to transmit information about a CSI process according to example embodiments described herein.

FIG. 7a illustrates a first example IE 700 used to transmit information about a CSI process. IE 700 may be an example of a CSI process IE and may be transmitted by the device. IE 700 may include a CSI process identifier 705 that may be used to identify a corresponding CSI process, a NZP CSI-RS identifier 707 that may be used to identify a resource(s) to be measured for the CSI report from a list of NZP CSI-RS resources, an IMR identifier 709 that may be used to identify a ratio to be used to measure interference from a list of IMRs, and a CQI report configuration identifier 711 that may be used to identify the report configuration (i.e., if the report is to be periodic or aperiodic, as well as parameters such as report time, report period, report frequency, report event, and the like) from a list of possible CQI report configurations. CQI report configuration identifier 711 may be associated with a CQI report configuration IE, which includes the list of possible CQI report configurations for the CSI process. The use of CQI report configuration identifier 711 may permit the CQI reporting to be configured independently across CSI processes. Similarly, a CSI process may be configured with periodic and/or aperiodic reporting so corresponding CQI report configuration IE may contain periodic and/or aperiodic reporting configurations as desired.

Figure 7B:
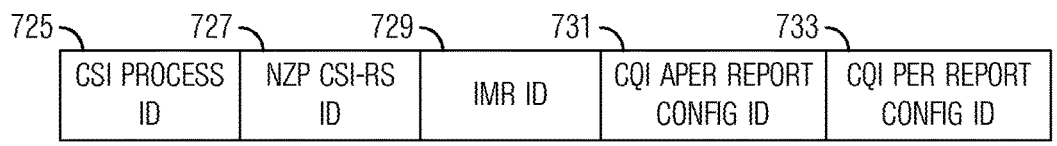
FIG. 7b illustrates a second example IE used to transmit information about a CSI process according to example embodiments described herein.

FIG. 7b illustrates a second example IE 720 used to transmit information about a CSI process. It may be possible that different CSI processes have the same aperiodic reporting configuration but different periodic reporting configurations, and vice versa. A further enhancement that may help reduce configuration overhead is to have separate identifiers for CQI aperiodic reporting configurations and CQI periodic reporting configurations. IE 720 may include a CSI process identifier 725 that may be used to identify a corresponding CSI process, a NZP CSI-RS identifier 727 that may be used to identify a resource(s) to be measured for the CSI report from a list of NZP CSI-RS resources, an IMR identifier 729 that may be used to identify a resource to be used to measure interference from a list of IMRs, a CQI aperiodic report configuration identifier 731 that may be used to identify an aperiodic CQI report configuration from a list of possible aperiodic CQI report configurations to be used for the aperiodic reporting of the CQI, and a CQI periodic report configuration identifier 733 that may be used to identify a periodic CQI report configuration from a list of possible periodic CQI report configurations to be used for the periodic reporting of the CQI.

Figure 7C:
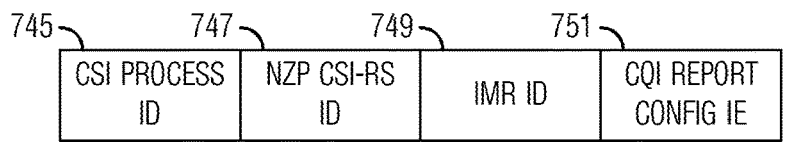
FIG. 7c illustrates a third example IE used to transmit information about a CSI process according to example embodiments described herein.

FIG. 7c illustrates a third example IE 740 used to transmit information about a CSI process. IE 740 may include a CSI process identifier 745 that may be used to identify a corresponding CSI process, a NZP CSI-RS identifier 747 that may be used to identify a resource(s) to be measured for the CSI report from a list of NZP CSI-RS resources, an IMR identifier 749 that may be used to identify a resource to be used to measure interference from a list of IMRs, and a CQI report configuration IE 751 that may be used to convey information regarding the CQI reporting configuration, e.g., aperiodic and/or periodic, period, frequency, event, time, and the like. Rather than using an identifier to associate with a particular CQI reporting configuration, IE 740 includes the CQI reporting configuration to be use in CQI report configuration IE 751.

Figure 7D:
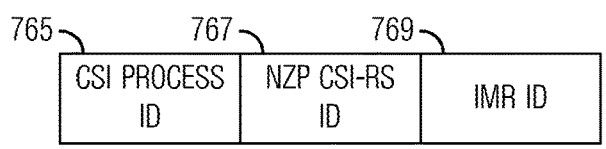
FIG. 7d illustrates a fourth example IE used to transmit information about a CSI process according to example embodiments described herein.

FIG. 7d illustrates a fourth example IE 760 used to transmit information about a CSI process. Instead of being configured in a CSI process IE, a CQI report configuration IE may be used. IE 760 is a CQI report configuration IE and may include a CSI process identifier 765 that may be used to identify a corresponding CSI process to which the CQI report configuration IE is applied, a NZP CSI-RS identifier 767 that may be used to identity a resource(s) to be measured for the CSI report from a list of NZP CSI-RS resources, an IMR identifier 769 that may be used to identify a resource to be used to measure interference from a list of IMRs, and other parameters related to the measurement reporting. Examples of the other parameters related to the measurement reporting include CQI reporting configuration information, such as aperiodic and/or periodic nature, period, frequency, event, time, and the like. A variation of IE 760 may include a CSI process identifier 765 that may be used to identify a corresponding CSI process to which the CQI report configuration IE is applied, and other parameters related to the measurement reporting.

The example embodiments presented herein explore a variety of techniques for signaling the configuration of the CSI processes. As an example, some example embodiments permit the same periodic and/or aperiodic CQI reporting to be configured for multiple CSI processes. As another example, example embodiments that use an identifier to refer to a particular CSI process configuration generally have lower CSI process configuration overhead than those that do not.

Please refer to an Addendum to the specification for example embodiments of specific implementations of CSI process configurations.

Each CSI process may be configured with or without subframe sets. There may be a number of options for configuring subframe sets, including:

The configuration of the subframe sets is included in a CQI report configuration for each CSI process;

The configuration of the subframe sets is included in each CSI process IE; and

If the subframe sets are configured for more than one CSI process on a component carrier, all CSI processes that have subframe sets configured shall use the same pair of subframe sets.

Therefore, a common subframe set configuration IE may be defined in a carrier and an indicator is included with each CSI process IE to indicate whether the common subframe set configuration IE applies to the CSI process defined by the CSI process IE. One technique that may be used is to define a common subframe set configuration IE using a CQI report configuration IE as used previously. It is noted that when carrier aggregation (CA) is used, currently restricted subframe sets apply only to primary component carrier (PCC) and does not impact secondary component carrier (SCC). Therefore, if the subframe set restraint extends to the SCC, the common subframe set configuration IE may be defined in a CQI report configuration for SCell ("CQI-ReportConfigSCell"). Another technique may be to define a separate IE, e.g., a CSI subframe pattern configuration IE in a given carrier.

Power is another consideration in CSI process configuration. With respect to CSI process configuration, the power offset ("Pc") typically refers to a power offset between the reference signal and a physical downlink shared channel (PDSCH) used for calculating the CSI feedback. Pc may be defined per NZP CSI-RS resource or per CSI process. Additionally, when enhanced intercell interference coordination (eICIC) is used, there may be two different subsets, e.g., time-frequency subsets, which are configured for a CSI process, and the Pc values for these subsets may be different. It may be possible to configure the Pc in a number of different ways depending on different assumptions.

Assuming that the Pc is defined per NZP CSI-RS resource configured, the Pc value of different CSI processes may be different because the CSI process is used to evaluate different CoMP processing techniques (e.g., dynamic point selection (DPS), dynamic point blanking (DPB), joint transmission (JT), and the like). Therefore, the Pc defined in the NZP CSI-RS resource may not be able to reflect the actual Pc of the CSI process.

According to an example embodiment, the Pc is configured per CSI process IE to indicate the corresponding offset for the CSI process, if no subframe sets are configured for the CSI process. Otherwise, an additional Pc offset (e.g, Pc offset1 or Pc1) is configured, where the original Pc (e.g., Pc) is used for subframe set 1 and the additional Pc offset (e.g., Pc offset1 or Pc1) is used for subframe set 2. In other words, two Pcs (e.g., Pc offset1 and Pc offset2) are configured per CSI process, where a first Pc is used for subframe set 1 and a second Pc is used for subframe set 2.

According to another example embodiment, a Pc identifier is configured per CSI process IE with each Pc identifier associating to a Pc configuration IE. If no subframe sets are configured for a CSI process, an associated Pc configuration IE includes one Pc. If subframe sets are configured for a CSI process, an associated Pc configuration IE includes two Pcs, with a first Pc being associated with subframe set 1 and a second Pc being associated with subframe set 2. A list of Pc configuration IEs may be configured, with a maximum number of Pc configuration IEs being equal to the number of CSI processes. It is noted that the actual Pc value of a CSI process may be equal to the Pc associated with the NZP CSI-RS (for the CSI process) plus a corresponding Pc offset.

According to an example embodiment, if the Pc is defined per CSI process configured, then a Pc is configured per CSI process IE if no subframe sets are configured for the CSI process. If subframe sets are configured for a CSI process, an additional Pc may be defined, wherein Pc may be used for subframe set 1 and the additional Pc may be used for subframe set 2. In other words, two Pcs are configured per CSI process IE when subframe sets are configured, where a first Pc is used for subframe set 1 and a second Pc is used for subframe set 2.

According to an alternative example embodiment, if the Pc is defined per CSI process configured, then a Pc identifier is configured per CSI process IE with each Pc identifier associating to a Pc configuration IE. If an associated Pc configuration IE includes one Pc, no subframe sets are configured for the CSI process. If an associated Pc configuration IE includes two Pcs, subframe sets are configured for a CSI process with a first Pc being associated with subframe set 1 and a second Pc being associated with subframe set 2. A list of Pc configuration IEs may be configured, with a maximum number of Pc configuration IEs being equal to the number of CSI processes.

In a situation with multiple carrier configuration (CoMP+CA), the configuration of aperiodic CQI feedback may be different for a primary cell (PCell) and a secondary cell (SCell). Therefore, the CQI report configuration for the PCell and the SCell is also different. Trigger bits include Bit1 indicating CC (a bitmap) and Bit2 indicating reporting CSI processes (also a bitmap).

Figure 8:
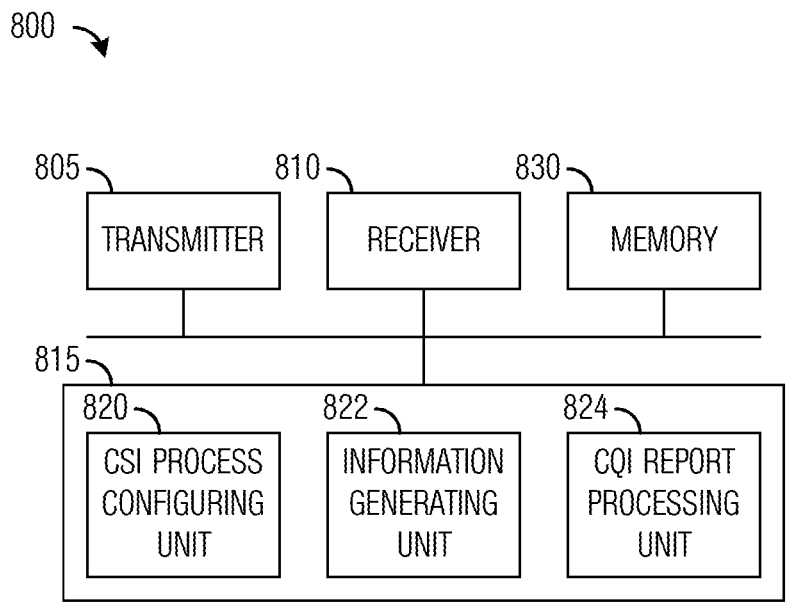
FIG. 8 illustrates an example first communications device according to example embodiments described herein.

FIG. 8 illustrates a first communications device 800. Communications device 800 may be an implementation of device, such as an eNB, an access point, a communications controller, a base station, and the like, or a network entity tasked to configure CSI processes. Communications device 800 may be used to implement various ones of the embodiments discussed herein. As shown in FIG. 8, a transmitter 805 is configured to transmit packets, information about CSI process configurations, and the like. Communications device 800 also includes a receiver 810 that is configured to receive packets, CQI reports, and the like.

A CSI process configuring unit 820 is configured to specify CSI processes for receiving devices. CSI process configuring unit 820 is configured to specify CSI process identifiers, NZP CSI-RS resource identifiers, IMR identifiers, CQI reporting configurations, CQI reporting configuration IEs, Pc, and the like. An information generating unit 822 is configured to generate information for the configured CSI processes. Information generating unit 822 is configured to generate messages for transmission to the receiving devices. A CQI report processing unit 824 is configured to process CQI reports received from the receiving devices and to determine channel quality or channel state information from the CQI reports. A memory 830 is configured to store data, CSI process IEs, CSI process configurations, CSI reporting configuration IEs, identifiers, CQI reports, channel quality or state information, and the like.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

As an example, receiver 810 and transmitter 805 may be implemented as a specific hardware block, while CSI process configuring unit 820, information generating unit 822, and CQI report processing unit 824 may be software modules executing in a microprocessor (such as processor 815) or a custom circuit or a custom compiled logic array of a field programmable logic array. CSI process configuring unit 820, information generating unit 822, and CQI report processing unit 824 may be modules stored in memory 830.

Figure 9:
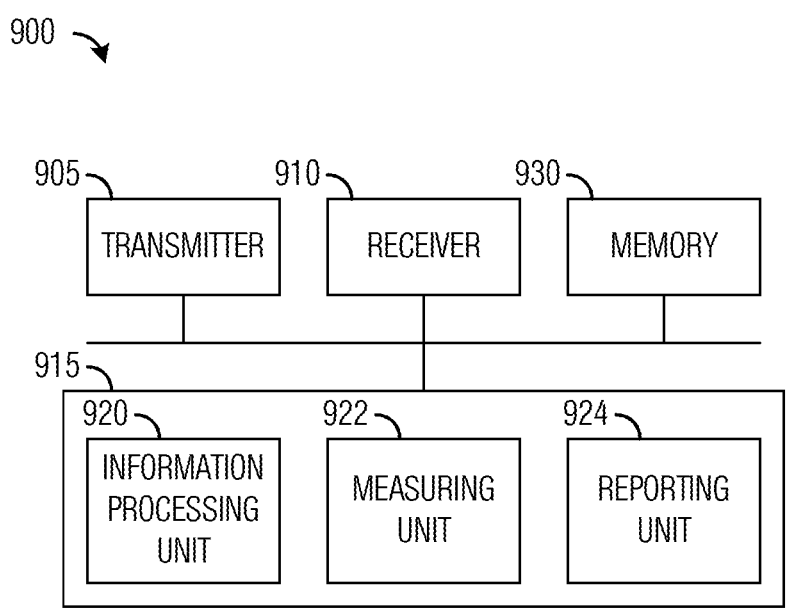
FIG. 9 illustrates an example second communications device according to example embodiments described herein.

FIG. 9 illustrates a second communications device 900. Communications device 800 may be an implementation of a receiving device, such as an eNB, an access point, a communications controller, a base station, and the like, or a UE, a mobile, a mobile station, a terminal, a user, a subscriber, and the like. Communications device 900 may be used to implement various ones of the embodiments discussed herein. As shown in FIG. 9, a transmitter 905 is configured to transmit packets, CQI reports, and the like. Communications device 900 also includes a receiver 910 that is configured to receive packets, information about CSI process configurations, and the like.

An information processing unit 920 is configured to process information about CSI process configurations to determine the configurations of CSI processes of the receiving device. A measuring unit 922 is configured to measure a communications channel using the NZP CSI-RS resources and interference using the IMRs provided by the information about CSI process configurations. Measuring unit 922 is configured to make power adjustments according to Pc values as needed. A reporting unit 924 is configured to generate CQI reports from the measurements made by measuring unit 922. Reporting unit 924 is configured to generate messages containing the CQI reports in accordance with CQI report configuration information or IEs. A memory 930 is configured to store data, CSI process IEs, information about CSI processes, CSI reporting configuration IEs, identifiers, CQI reports, channel quality or state measurements, and the like.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, receiver 910 and transmitter 905 may be implemented as a specific hardware block, while information processing unit 920, measuring unit 922, and reporting unit 924 may be software modules executing in a microprocessor (such as processor 815) or a custom circuit or a custom compiled logic array of a field programmable logic array. Information processing unit 920, measuring unit 922, and reporting unit 924 may be modules stored in memory 930.

Although the present disclosure and its advantages have been described in detail, it should be understood that various changes, substitutions and alterations can be made herein without departing from the spirit and scope of the disclosure as defined by the appended claims.

ADDENDUM

CSI Process Configuration

PhysicalConfigDedicated Information Element

```
-- ASN1START
PhysicalConfigDedicated ::=      SEQUENCE {
      pdsch-ConfigDedicated           PDSCH-ConfigDedicated            OPTIONAL,       -- Need ON
      pucch-ConfigDedicated           PUCCH-ConfigDedicated            OPTIONAL,       -- Need ON
      pusch-ConfigDedicated           PUSCH-ConfigDedicated            OPTIONAL,       -- Need ON
      uplinkPowerControlDedicated     UplinkPowerControlDedicated      OPTIONAL,       -- Need ON
      tpc-PDCCH-ConfigPUCCH           TPC-PDCCH-Config                 OPTIONAL,       -- Need ON
      tpc-PDCCH-ConfigPUSCH           TPC-PDCCH-Config                 OPTIONAL,       -- Need ON
      cqi-ReportConfig                CQI-ReportConfig                 OPTIONAL,       -- Cond CQI-r8
      soundingRS-UL-ConfigDedicated   SoundingRS-UL-ConfigDedicated    OPTIONAL,       -- Need ON
      antennaInfo                     CHOICE {
           explicitValue                   AntennaInfoDedicated,
           defaultValue                    NULL
      }        OPTIONAL,                                                               -- Cond AI-r8
      schedulingRequestConfig         SchedulingRequestConfig          OPTIONAL,       -- Need ON
      ...,
      [[ cqi-ReportConfig-v920        CQI-ReportConfig-v920            OPTIONAL,       -- Cond CQI-r8
      antennaInfo-v920                AntennaInfoDedicated-v920        OPTIONAL        -- Cond AI-r8
      ]],
      [[ antennaInfo-r10              CHOICE {
           explicitValue-r10               AntennaInfoDedicated-r10,
           defaultValue                    NULL
      }        OPTIONAL,                                                               -- Cond AI-r10
      antennaInfoUL-r10               AntennaInfoUL-r10                OPTIONAL,       -- Need ON
      cif-Presence-r10                BOOLEAN                          OPTIONAL,       -- Need ON
      cqi-ReportConfig-r10            CQI-ReportConfig-r10             OPTIONAL,       -- Cond CQI-r10
      csi-RS-Config-r10               CSI-RS-Config-r10                OPTIONAL,       -- Need ON
      pucch-ConfigDedicated-v1020     PUCCH-ConfigDedicated-v1020      OPTIONAL,       -- Need ON
      pusch-ConfigDedicated-v1020     PUSCH-ConfigDedicated-v1020      OPTIONAL,       -- Need ON
      schedulingRequestConfig-v1020   SchedulingRequestConfig-v1020    OPTIONAL,       -- Need ON
      soundingRS-UL-ConfigDedicated-v1020
                                      SoundingRS-UL-ConfigDedicated-v1020  OPTIONAL,   -- Need ON
```

-continued

```
        soundingRS-UL-ConfigDedicatedAperiodic-r10
                         SoundingRS-UL-ConfigDedicatedAperiodic-r10   OPTIONAL,        -- Need
ON
        uplinkPowerControlDedicated-v1020   UplinkPowerControlDedicated-v1020   OPTIONAL      --
Need ON
    ]],
    [[  additionalSpectrumEmissionCA-r10       CHOICE {
            release                            NULL,
            setup                              SEQUENCE {
                additionalSpectrumEmissionPCell-r10     AdditionalSpectrumEmission
            }
        }               OPTIONAL     -- Need ON
    ]]
    [[  --NZP CSI-RS
        csi-RS-ToReleaseList-r11               CSI-RS-ToReleaseList-r11    OPTIONAL,       -- Need ON
        csi-RS-ToAddModList-r11                CSI-RS-ToAddModList-r11     OPTIONAL        -- Need ON
        --IMR
        imr-ToRemoveList-r11                   IMR-ToRemoveList-r11        OPTIONAL,       -- Need ON
        imr-ToAddModList-r11                   IMR-ToAddModList-r11        OPTIONAL,       -- Need ON
        --CQI ReportConfig
        cqi-ReportConfigToRemoveList-r11       CQI-ReportConfigToRemoveList-r11   OPTIONAL,     -- Cond
CQI-r11
        cqi-ReportConfigToAddModList-r11       CQI-ReportConfigToAddModList-r11   OPTIONAL,     -- Cond
CQI-r11
        --CSI process configurations
        csi-ProcessIdToRemoveList-r11          CSI-ProcessIdToRemoveList-r11      OPTIONAL, -- Cond CQI-
r11
        csi-ProcessIdToAddModList-r11          CSI-ProcessIdToAddModList-r11      OPTIONAL, -- Cond CQI-
r11
    ]]
}
PhysicalConfigDedicatedSCell-r10 ::=           SEQUENCE {
    -- DL configuration as well as configuration applicable for DL and UL
    nonUL-Configuration-r10                    SEQUENCE {
        antennaInfo-r10                        AntennaInfoDedicated-r10    OPTIONAL,       -- Need
ON
        crossCarrierSchedulingConfig-r10       CrossCarrierSchedulingConfig-r10   OPTIONAL,    -
- Need ON
        csi-RS-Config-r10                      CSI-RS-Config-r10           OPTIONAL,       -- Need
ON
        pdsch-ConfigDedicated-r10              PDSCH-ConfigDedicated       OPTIONAL        -- Need
ON
    }                                                      OPTIONAL,       -- Cond SCellAdd
    -- UL configuration
    ul-Configuration-r10                       SEQUENCE {
        antennaInfoUL-r10                      AntennaInfoUL-r10           OPTIONAL,       -- Need
ON
        pusch-ConfigDedicatedSCell-r10         PUSCH-ConfigDedicatedSCell-r10   OPTIONAL,    -
- Need ON
        uplinkPowerControlDedicatedSCell-r10   UplinkPowerControlDedicatedSCell-r10    OPTIONAL,
        -- Need ON
        cqi-ReportConfigSCell-r10              CQI-ReportConfigSCell-r10   OPTIONAL,       -- Need
ON
        soundingRS-UL-ConfigDedicated-r10      SoundingRS-UL-ConfigDedicated     OPTIONAL,  --
Need ON
        soundingRS-UL-ConfigDedicated-v1020
                         SoundingRS-UL-ConfigDedicated-v1020   OPTIONAL,           -- Need ON
        soundingRS-UL-ConfigDedicatedAperiodic-r10
                         SoundingRS-UL-ConfigDedicatedAperiodic-r10   OPTIONAL           -- Need
ON
    }                                                      OPTIONAL,       -- Cond
CommonUL
    ...,
    [[  --NZP CSI-RS
        csi-RS-ToReleaseList-r11               CSI-RS-ToReleaseList-r11    OPTIONAL,       -- Need ON
        csi-RS-ToAddModList-r11                CSI-RS-ToAddModList-r11     OPTIONAL        -- Need ON
        --IMR
        imr-ToRemoveList-r11                   IMR-ToRemoveList-r11        OPTIONAL,       -- Need ON
        imr-ToAddModList-r11                   IMR-ToAddModList-r11        OPTIONAL,       -- Need ON
        --CQI ReportConfig
        cqi-ReportConfigToRemoveList-r11       CQI-ReportConfigToRemoveList-r11   OPTIONAL,     -- Cond
CQI-r11
        cqi-ReportConfigToAddModList-r11       CQI-ReportConfigToAddModList-r11   OPTIONAL,     -- Cond
CQI-r11
        --CSI process configurations
        csi-ProcessIdToRemoveList-r11          CSI-ProcessIdToRemoveList-r11 OPTIONAL,      -- Cond CQI-
```

-continued

```
r11
        csi-ProcessIdToAddModList-r11    CSI-ProcessIdToAddModList-r11 OPTIONAL,    -- Cond CQI-
r11
    ]]
}
CSI-RS-ToReleaseList-r11 ::=         SEQUENCE (SIZE (1..maxCSI-RS-r11)) OF CSI-RS-Identity-r11
CSI-RS-ToAddModList-r11 ::=          SEQUENCE (SIZE (1..maxCSI-RS-r11)) OF CSI-RS-Config2-r11
IMR-ToRemoveList-r11 ::=             SEQUENCE (SIZE (1..maxIMR-r11)) OF IMR-Id
IMR-ToAddModList-r11 ::=             SEQUENCE (SIZE (1..maxIMR-r11)) OF IMR-Config-r11
CQI-ReportConfigToRemoveList-r11 ::= SEQUENCE (SIZE (1..maxCSI-process-r11)) OF CQI-
ReportConfig-Id
CQI-ReportConfigToAddModList-r11 ::= SEQUENCE (SIZE (1..maxCSI-process-r11)) OF CQI-
ReportConfig-r11
CSI-ProcessIdToRemoveList-r11 ::=    SEQUENCE (SIZE (1..maxCSI-process-r11)) OF CSI-Process-Id
CSI-ProcessIdToAddModList-r11 ::=    SEQUENCE (SIZE (1..maxCSI-process-r11)) OF CSI-ProcessConfig-
r11
-- ASN1STOP
```

| Conditional presence | Explanation |
|---|---|
| AI-r8 | The field is optionally present, need ON, if antennaInfoDedicated-r10 is absent. Otherwise the field is not present |
| AI-r10 | The field is optionally present, need ON, if antennaInfoDedicated is absent. Otherwise the field is not present |
| CommonUL | The field is mandatory present if ul-Configuration of RadioResourceConfigCommonSCell-r10 is present; otherwise it is optional, need ON. |
| CQI-r8 | The field is optionally present, need ON, if cqi-ReportConfig-r10 is absent. Otherwise the field is not present |
| CQI-r10 | The field is optionally present, need ON, if cqi-ReportConfig is absent. Otherwise the field is not present |
| SCellAdd | The field is mandatory present if cellIdentification is present; otherwise it is optional, need ON. |
| CQI-r11 | The field is optionally present, need ON, if cqi-ReportConfig and cqi-ReportConfig-r10 are absent. Otherwise the field is not present. |

IMR-Config

The IE IMR-Config is the CSI-RS resource configuration that may be configured on a serving frequency to measure the interference and noise when using transmission mode 10.

IMR-Config Information Elements

```
-- ASN1START
IMR-Config-r11 ::=        SEQUENCE {
    imr-Id                IMR-Id,
    resourceConfig2-r11   INTEGER (0..15),
    subframeConfig-r11    INTEGER (0..154)
    ...
}
-- ASN1STOP
```

Note: IMR consists of 4 REs, hence there are overall 16 configurations.

| IMR-Config-r11 field descriptions |
|---|
| 1. resourceConfig2 |
| 2. Parameter: 4 RE CSI reference signal configurations. see TS 36.211. |
| 3. subframeConfig |
| 4. Parameter: $I_{CSI-RS}$, see TS 36.211 [21, table 6.10.5.3-1]. |

IMR-Id

The IE IMR-Id is used to identify an IMR resource configuration that is configured by the IE IMR-Config. The identity is unique within the scope of a carrier frequency.

IMR-Id Information Elements

```
-- ASN1START
IMR-Id ::=     INTEGER(1.. maxIMR-r11)
-- ASN1STOP
```

CQI-ReportConfig

The IE CQI-ReportConfig is used to specify the CQI reporting configuration.

CQI-ReportConfig Information Elements

```
-- ASN1START
CQI-ReportConfig ::=             SEQUENCE {
    cqi-ReportModeAperiodic      CQI-ReportModeAperiodic OPTIONAL,    -- Need OR
    nomPDSCH-RS-EPRE-Offset      INTEGER (-1..6),
    cqi-ReportPeriodic           CQI-ReportPeriodic OPTIONAL          -- Need ON
}
CQI-ReportConfig-v920 ::=        SEQUENCE {
    cqi-Mask-r9                  ENUMERATED {setup}     OPTIONAL,     -- Cond cqi-Setup
    pmi-RI-Report-r9             ENUMERATED {setup}     OPTIONAL      -- Cond PMIRI
}
```

```
CQI-ReportConfig-r10 ::=         SEQUENCE {
    cqi-ReportAperiodic-r10         CQI-ReportAperiodic-r10       OPTIONAL,     -- Need ON
    nomPDSCH-RS-EPRE-Offset         INTEGER (–1..6),
    cqi-ReportPeriodic-r10          CQI-ReportPeriodic-r10        OPTIONAL,     -- Need ON
    pmi-RI-Report-r9                ENUMERATED {setup}            OPTIONAL,     -- Cond
PMIRIPCell
    csi-SubframePatternConfig-r10   CHOICE {
        release                         NULL,
        setup                           SEQUENCE {
            csi-MeasSubframeSet1-r10        MeasSubframePattern-r10,
            csi-MeasSubframeSet2-r10        MeasSubframePattern-r10
        }
    } OPTIONAL -- Need ON
}
CQI-ReportConfig-r11 ::=         SEQUENCE {
    cqi-ReportConfig-Id             CQI-ReportConfig-Id,
    --need RAN1 inputs
    cqi-ReportAperiodic-r11         CQI-ReportAperiodic-r11       OPTIONAL,     -- Need ON
    cqi-ReportPeriodic-r11          CQI-ReportPeriodic-r11        OPTIONAL,     -- Need ON
    .........
}
CQI-ReportConfigSCell-r10 ::=              SEQUENCE {
    cqi-ReportModeAperiodic-r10     CQI-ReportModeAperiodic OPTIONAL,           -- Need OR
    nomPDSCH-RS-EPRE-Offset-r10     INTEGER (–1..6),
    cqi-ReportPeriodicSCell-r10     CQI-ReportPeriodic-r10        OPTIONAL,     -- Need ON
    pmi-RI-Report-r10               ENUMERATED {setup}            OPTIONAL      -- Cond
PMIRISCell
}
CQI-ReportPeriodic ::=      CHOICE {
    release                         NULL,
    setup                           SEQUENCE {
        cqi-PUCCH-ResourceIndex         INTEGER (0..1185),
        cqi-pmi-ConfigIndex             INTEGER (0..1023),
        cqi-FormatIndicatorPeriodic     CHOICE {
            widebandCQI                     NULL,
            subbandCQI                      SEQUENCE {
                k                               INTEGER (1..4)
            }
        },
        ri-ConfigIndex                  INTEGER (0..1023)    OPTIONAL,          -- Need
OR
        simultaneousAckNackAndCQI       BOOLEAN
    }
}
CQI-ReportPeriodic-r10 ::=       CHOICE {
    release                         NULL,
    setup                           SEQUENCE {
        cqi-PUCCH-ResourceIndex-r10     INTEGER (0..1184),
        cqi-PUCCH-ResourceIndexP1-r10   INTEGER (0..1184)             OPTIONAL, -- Need
OR
        cqi-pmi-ConfigIndex             INTEGER (0..1023),
        cqi-FormatIndicatorPeriodic-r10 CHOICE {
            widebandCQI-r10                 SEQUENCE {
                csi-ReportMode-r10              ENUMERATED {submode1, submode2}     OPTIONAL   -- Need
OR
            },
            subbandCQI-r10                  SEQUENCE {
                k                               INTEGER (1..4),
                periodicityFactor-r10           ENUMERATED {n2, n4}
            }
        },
        ri-ConfigIndex                  INTEGER (0..1023)     OPTIONAL,         -- Need
OR
        simultaneousAckNackAndCQI       BOOLEAN,
        cqi-Mask-r9                     ENUMERATED {setup}    OPTIONAL,         -- Need
OR
        csi-ConfigIndex-r10             CHOICE {
            release                         NULL,
            setup                           SEQUENCE {
                cqi-pmi-ConfigIndex2-r10        INTEGER (0..1023),
                ri-ConfigIndex2-r10             INTEGER (0..1023)     OPTIONAL   -- Need
OR
            }
        }          OPTIONAL                                                     -- Need
ON
    }
}
CQI-ReportAperiodic-r10 ::=      CHOICE {
    release                         NULL,
```

-continued

```
        setup                           SEQUENCE {
            cqi-ReportModeAperiodic-r10     CQI-ReportModeAperiodic,
            aperiodicCSI-Trigger-r10        SEQUENCE {
                trigger1-r10                    BIT STRING (SIZE (8)),
                trigger2-r10                    BIT STRING (SIZE (8))
            }                                                           OPTIONAL    -- Need
OR
        }
    }
}
CQI-ReportModeAperiodic ::=         ENUMERATED {
                                        rm12, rm20, rm22, rm30, rm31,
                                        spare3, spare2, spare1
                                    }
}
-- ASN1STOP
```

CQI-ReportConfig-Id

The IE CQI-ReportConfig-Id is used to identify a CQI Report configuration that is configured by the IE CQI-ReportConfig. The identity is unique within the scope of a carrier frequency.

IMR-Id Information Elements

```
-- ASN1START
CQI-ReportConfig-Id ::=    INTEGER (1.. maxCSI-process-r11)
-- ASN1STOP
```

CSI-Process-Config

The IE CSI-Process-Config is the CSI feedback configuration that E-UTRAN may configure on a serving frequency when using transmission mode 10.

CSI-Process-Config Information Elements

```
-- ASN1START
CSI-Process-Config-r11 ::=    SEQUENCE {
```

-continued

```
    csi-Process-Id      CSI-Process-Id,
    csi-RS-Identity-r11 CSI-RS-Identity-r11,
    imr-Id              IMR-Id,
    cqi-ReportConfig-Id CQI-ReportConfig-Id
    ...
}
-- ASN1STOP
```

CSI-Process-Id

The IE CSI-Process-Id is used to identify a CSI process that is configured by the IE CSI-Process-Config. The identity is unique within the scope of a carrier frequency.

CSI-Process-Id Information Elements

```
-- ASN1START
CSI-Process-Id ::=      INTEGER (1.. maxCSI-process-r11)
-- ASN1STOP
```

6.4 RRC Multiplicity and Type Constraint Values

Multiplicity and Type Constraint Definitions

```
-- ASN1START
maxBandComb-r10         INTEGER ::= 128   -- Maximum number of band combinations.
maxBands                INTEGER ::= 64    -- Maximum number of bands listed in EUTRA UE caps
maxBandwidthClass-r10   INTEGER ::= 16    -- Maximum number of supported CA BW classes per band
maxBandwidthCombSet-r10 INTEGER ::= 32    -- Maximum number of bandwidth combination sets per
-- supported band combination
maxCDMA-BandClass       INTEGER ::= 32    -- Maximum value of the CDMA band classes
maxCellBlack            INTEGER ::= 16    -- Maximum number of blacklisted physical cell
identity
-- ranges listed in SIB type 4 and 5
maxCellInfoGERAN-r9     INTEGER ::= 32    -- Maximum number of GERAN cells for which system in-
-- formation can be provided as redirection
assistance
maxCellInfoUTRA-r9      INTEGER ::= 16    -- Maximum number of UTRA cells for which system
-- information can be provided as redirection
-- assistance
maxFreqUTRA-TDD-r10     INTEGER ::= 6     -- Maximum number of UTRA TDD carrier frequencies for
-- which system information can be provided as
-- redirection assistance
maxCellInter            INTEGER ::= 16    -- Maximum number of neighbouring inter-frequency
-- cells listed in SIB type 5
maxCellIntra            INTEGER ::= 16    -- Maximum number of neighbouring intra-frequency
-- cells listed in SIB type 4
maxCellListGERAN        INTEGER ::= 3     -- Maximum number of lists of GERAN cells
maxCellMeas             INTEGER ::= 32    -- Maximum number of entries in each of the
-- cell lists in a measurement object
maxCellReport           INTEGER ::= 8     -- Maximum number of reported cells
maxCSI-process-r11      INTEGER ::= 3/4   -- Maximum number of CSI processes per carrier
frequency
```

-continued

| | | |
|---|---|---|
| maxDRB | INTEGER ::= 11 | -- Maximum number of Data Radio Bearers |
| maxEARFCN | INTEGER ::= 65535 | -- Maximum value of EUTRA carrier fequency |
| maxFreq | INTEGER ::= 8 | -- Maximum number of carrier frequencies |
| maxGERAN-SI | INTEGER ::= 10 | -- Maximum number of GERAN SI blocks that can be<br>-- provided as part of NACC information |
| maxGNFG | INTEGER ::= 16 | -- Maximum number of GERAN neighbour freq groups |
| maxIMR-r11 | INTEGER ::= 3/4 | -- Maximum number of IMR per carrier frequency |
| maxLogMeasReport-r10 | INTEGER ::= 520 | -- Maximum number of logged measurement entries<br>-- that can be reported by the UE in one message |
| maxMBSFN-Allocations | INTEGER ::= 8 | -- Maximum number of MBSFN frame allocations with<br>-- different offset |
| maxMBSFN-Area | INTEGER ::= 8 | |
| maxMBSFN-Area-1 | INTEGER ::= 7 | |
| maxMeasId | INTEGER ::= 32 | |
| maxMultiBands | INTEGER ::= 8 | -- Maximum number of additional frequency bands<br>-- that a cell belongs to |
| maxObjectId | INTEGER ::= 32 | |
| maxPageRec | INTEGER ::= 16 | -- |
| maxPhysCellIdRange-r9 | INTEGER ::= 4 | -- Maximum number of physical cell identity ranges |
| maxPNOffset | INTEGER ::= 511 | -- Maximum number of CDMA2000 PNOffsets |
| maxPMCH-PerMBSFN | INTEGER ::= 15 | |
| maxRAT-Capabilities | INTEGER ::= 8 | -- Maximum number of interworking RATS (incl EUTRA) |
| maxReportConfigId | INTEGER ::= 32 | |
| maxRSTD-Freq-r10 | INTEGER ::= 3 | -- Maximum number of frequency layers for RSTD<br>-- measurement |
| maxSCell-r10 | INTEGER ::= 4 | -- Maximum number of SCells |
| maxServCell-r10 | INTEGER ::= 5 | -- Maximum number of Serving cells |
| maxServiceCount<br>included | INTEGER ::= 16 | -- Maximum number of MEMS services that can be<br><br>-- in an MBMS counting request and response |
| maxServiceCount-1 | INTEGER ::= 15 | |
| maxSessionPerPMCH | INTEGER ::= 29 | |
| maxSessionPerPMCH-1 | INTEGER ::= 28 | |
| maxSIB | INTEGER ::= 32 | -- Maximum number of SIBs |
| maxSIB-1 | INTEGER ::= 31 | |
| maxSI-Message | INTEGER ::= 32 | -- Maximum number of SI messages |
| maxSimultaneousBands-r10 | INTEGER ::= 64 | -- Maximum number of simultaneously aggregated bands |
| maxCSI-RS-r11 | INTEGER ::= 3 | -- Maximum number of CSI RS resource<br>-- configurations per frequency) |
| maxUTRA-FDD-Carrier | INTEGER ::= 16 | -- Maximum number of UTRA FDD carrier frequencies |
| maxUTRA-TDD-Carrier | INTEGER ::= 16 | -- Maximum number of UTRA TDD carrier frequencies<br>-- ASN1STOP |

NOTE: The value of maxDRB aligns with SA2.
End of EUTRA-RRC-Definitions

```
-- ASN1START
END
-- ASN1STOP
```

What is claimed is:

1. A method for communicating in a wireless communications system, the method comprising:

selecting, by a network node, a first channel quality indicator (CQI) report configuration from a plurality of CQI report configurations, each of the plurality of CQI report configurations comprising a set of parameters specifying a manner in which CQIs are reported, and each of the plurality of CQI report configurations is associated with a CQI report configuration identifier uniquely identifying a respective CQI report configuration from the plurality of CQI report configurations; and transmitting, by the network node, a message comprising a channel state information (CSI) process (CSI-process) information element (IE) to a user equipment (UE), the CSI-process IE specifying a CSI process configuration on a serving frequency, wherein the CSI-process IE carries one or more CSI-process fields, the one or more CSI-process fields including a first CQI report configuration identifier (cqi-ReportConfig-Id) associated with the first CQI report configuration and uniquely identifying the first CQI report configuration from the plurality of CQI report configurations, the first CQI report configuration comprising a first set of parameters specifying a first manner according to which CQIs are reported, and wherein the CSI-process IE further comprises a periodic CQI report configuration identifier identifying a periodic CQI report configuration.

2. The method of claim 1, wherein the message further comprises a CQI report configuration IE.

3. The method of claim 1, wherein the CSI-process IE further comprises an aperiodic CQI report configuration identifier identifying an aperiodic CQI report configuration.

4. The method of claim 1, wherein the CSI-process IE further comprises information about a single CSI process.

5. The method of claim 1, wherein the CSI-process IE further comprises information about CSI processes associated with a single receiving device.

6. The method of claim 1, wherein the CSI-process IE further comprises a power offset.

7. The method of claim 1, further comprising receiving a CQI report in accordance with the first CQI report configuration.

8. The method of claim 1, wherein the one or more CSI-process fields further comprise a csi-Process-Id, a csi-RS-Identity, or an imr-Id.

9. An apparatus, comprising:
a processor; and
a non-transitory computer readable storage medium storing programming for execution by the processor, the programming includes instructions to:
select a first channel quality indicator (CQI) report configuration from a plurality of CQI report configurations, each of the plurality of CQI report configurations comprising a set of parameters specifying a manner in which CQIs are reported, and each of the plurality of CQI report configurations is associated with a CQI report configuration identifier uniquely identifying a respective CQI report configuration from the plurality of CQI report configurations; and
transmit a message comprising a channel state information (CSI) process (CSI-process) information element (IE) to a user equipment (UE), the CSI-process IE specifying a CSI process configuration on a serving frequency,
wherein the CSI-process IE carries one or more CSI-process fields, the one or more CSI-process fields including a first CQI report configuration identifier (cqi-ReportConfig-Id) associated with the first CQI report configuration and uniquely identifying the first CQI report configuration from the plurality of CQI report configurations, the first CQI report configuration comprising a first set of parameters specifying a first manner according to which CQIs are reported,
wherein the CSI-process IE further comprises a periodic CQI report configuration identifier identifying a periodic CQI report configuration.

10. The apparatus of claim 9, wherein the message further comprises a CQI report configuration IE.

11. The apparatus of claim 9, wherein the CSI-process IE further comprises an aperiodic CQI report configuration identifier identifying an aperiodic CQI report configuration.

12. The apparatus of claim 9, wherein the CSI-process IE further comprises information about a single CSI process.

13. The apparatus of claim 9, wherein the CSI-process IE further comprises information about CSI processes associated with a single receiving device.

14. The apparatus of claim 9, wherein the CSI-process IE further comprises a power offset.

15. The apparatus of claim 9, wherein the programming comprises further instructions to receive a CQI report in accordance with the first CQI report configuration.

16. The apparatus of claim 9, wherein the apparatus is one of an evolved NodeB and an entity tasked to configure CSI processes.

17. The apparatus of claim 9, wherein the one or more CSI-process fields further comprise a csi-Process-Id, a csi-RS-Identity, or an imr-Id.

18. A method for communicating in a wireless communications system, the method comprising:
receiving, by a user equipment (UE) from a network node, a message comprising a channel state information (CSI) process (CSI-process) information element (IE), the CSI-process IE specifying a CSI process configuration on a serving frequency,
wherein the CSI-process IE carries one or more CSI-process fields, the one or more CSI-process fields including a first channel quality indicator (CQI) report configuration identifier (cqi-ReportConfig-Id) associated with an individual CQI report configuration of a plurality of CQI report configurations and uniquely identifying the individual CQI report configuration from the plurality of CQI report configurations, and each of the plurality of CQI report configurations comprising a set of parameters specifying a manner in which CQIs are reported in a CSI process, and each of the plurality of CQI report configurations has an associated CQI report configuration identifier uniquely identifying a respective CQI report configuration from the plurality of CQI report configurations, wherein the individual CQI report configuration comprises a first set of parameters specifying a first manner according to which CQIs are reported; and
selecting the individual CQI report configuration from the plurality of CQI report configurations in accordance with the first CQI report configuration identifier received; and
wherein the CSI-process IE further comprises a periodic CQI report configuration identifier identifying a periodic CQI report configuration.

19. The method of claim 18, wherein the CSI-process IE further comprises an aperiodic CQI report configuration identifier identifying an aperiodic CQI report configuration.

20. The method of claim 18, further comprising:
transmitting, by the UE, a CQI report in accordance with the individual CQI report configuration.

21. The method of claim 18, wherein the one or more CSI-process fields further comprise one of a csi-Process-Id, a csi-RS-Identity, and an imr-Id.

22. A user equipment (UE), comprising:
a processor; and
a non-transitory computer readable storage medium storing programing for execution by the processor, the programming includes instructions to:
receive, from network node, a message comprising a channel state information (CSI) process (CSI-process) information element (IE), the CSI-process IE specifying a CSI process configuration on a serving frequency,
wherein the CSI-process IE carries one or more CSI-process fields, the one or more CSI-process fields including a first channel quality indicator (CQI) report configuration identifier (cqi-ReportConfig-Id) associated with an individual CQI report configuration in a plurality of CQI report configurations and uniquely identifying the individual CQI report configuration from the plurality of CQI report configurations, the plurality of CQI report configurations comprising different sets of parameters specifying a manner in which CQIs are reported in a CSI process, and each of the plurality of CQI report configurations has an associated CQI report configuration identifier uniquely identifying a respective CQI report configuration from the plurality of CQI report configurations, wherein the individual CQI report configuration comprises a first set of parameters specifying a first manner according to which CQIs are reported; and
select the individual CQI report configuration from the plurality of CQI report configurations in accordance with the first CQI report configuration identifier received; and
wherein the CSI-process IE further comprises a periodic CQI report configuration identifier identifying a periodic CQI report configuration.

23. The UE of claim 22, wherein the CSI-process IE further comprises an aperiodic CQI report configuration identifier identifying an aperiodic CQI report configuration.

24. The UE of claim 22, wherein the programming comprises further instructions to transmit a CQI report in accordance with the individual CQI report configuration.

25. The UE of claim 22, wherein the one or more CSI-process fields further comprise one of a csi-Process-ld, a csi-RS-Identity, and an imr-Id.

\* \* \* \* \*

UNITED STATES PATENT AND TRADEMARK OFFICE
CERTIFICATE OF CORRECTION

PATENT NO. : 10,945,270 B2  
APPLICATION NO. : 14/040306  
DATED : March 9, 2021  
INVENTOR(S) : Bi et al.

Page 1 of 1

It is certified that error appears in the above-identified patent and that said Letters Patent is hereby corrected as shown below:

In the Claims

In Column 21, Line 54, Claim 1, delete "CQls" and insert --CQIs--.

In Column 22, Line 44, Claim 1, delete "CQls" and insert --CQIs--.

In Column 22, Line 66, Claim 8, delete "csi-Process-ld" and insert --csi-Process-Id--.

In Column 23, Line 10, Claim 9, delete "CQls" and insert --CQIs--.

In Column 23, Line 28, Claim 9, delete "CQls" and insert --CQIs--.

In Column 23, Line 51, Claim 17, delete "csi-Process-ld" and insert --csi-Process-Id--.

In Column 24, Line 3, Claim 18, delete "CQls" and insert --CQIs--.

In Column 24, Line 10, Claim 18, delete "CQls" and insert --CQIs--.

In Column 24, Line 26, Claim 21, delete "csi-Process-ld" and insert --csi-Process-Id--.

In Column 24, Line 47, Claim 22, delete "CQls" and insert --CQIs--.

In Column 24, Line 53, Claim 22, delete "CQls" and insert --CQIs--.

In Column 25, Line 2, Claim 25, delete "csi-Process-ld" and insert --csi-Process-Id--.

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*